United States Patent [19]
Bartlett

[11] Patent Number: 5,521,476
[45] Date of Patent: May 28, 1996

[54] CMOS DISK DRIVE MOTOR CONTROL CIRCUIT HAVING BACK-EMF BLOCKING CIRCUITRY

[75] Inventor: Donald M. Bartlett, Fort Collins, Colo.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 521,374

[22] Filed: Aug. 24, 1995

Related U.S. Application Data

[63] Continuation of Ser. No. 131,822, Oct. 5, 1993, abandoned.

[51] Int. Cl.$^6$ ............................................... G05B 9/02
[52] U.S. Cl. ........................ 318/563; 318/466; 360/105
[58] Field of Search .................................. 318/560–563, 318/565–567, 590–591, 615, 626, 685, 135, 139, 445–6, 449, 466, 476, 254, 138, 439; 361/23, 33, 88, 91, 111; 360/75, 105, 69, 104; 327/270, 223–226, 229, 265–266, 273–276, 282–285, 299–303; 363/50–58

[56] References Cited

U.S. PATENT DOCUMENTS

| | | | |
|---|---|---|---|
| 4,086,659 | 4/1978 | Cizmic et al. | 364/900 |
| 4,237,501 | 12/1980 | Barmache et al. | 360/75 |
| 4,438,377 | 3/1984 | Sakai et al. | 318/254 |
| 4,481,449 | 11/1984 | Rodal | 318/375 |
| 4,679,102 | 7/1987 | Wevers et al. | 360/75 |
| 4,767,970 | 8/1988 | Rodal | 318/375 |
| 4,786,995 | 11/1988 | Stupek et al. | 360/75 |
| 4,831,469 | 5/1989 | Hanson et al. | 360/75 |
| 4,839,754 | 6/1989 | Gami et al. | 360/73.01 |
| 4,866,554 | 9/1989 | Stupek et al. | 360/105 |
| 5,091,680 | 2/1992 | Palm | 318/368 |
| 5,117,314 | 5/1992 | Bathaee et al. | 360/51 |

*Primary Examiner*—David S. Martin
*Attorney, Agent, or Firm*—Wayne P. Bailey; Paul W. Martin

[57] ABSTRACT

A CMOS disk drive motor control circuit which has back-EMF blocking circuitry for preventing the back-EMF from being dissipated when power is removed from the disk drive motor. The back-EMF provides an alternate power source for parking the read/write head. The circuit is fabricated as a single CMOS integrated circuit which is coupled between a power supply and the disk drive motor. The circuit also includes disk drive head parking circuitry and voltage regulator circuitry.

1 Claim, 1 Drawing Sheet

CMOS DISK DRIVE MOTOR CONTROL CIRCUIT HAVING BACK-EMF BLOCKING CIRCUITRY

CROSS REFERENCE TO RELATED APPLICATION

This is a continuation of application Ser. No. 08/131,822 filed Oct. 5, 1993, now abandoned.

The present invention is related to commonly assigned and co-pending U.S. patent application entitled "CMOS Disk Drive Motor Control Circuit Having Back-EMF Regulator Circuitry" and having a Ser. No. of 08/181,827.

BACKGROUND OF THE INVENTION

The present invention relates to disk drive control circuits, and more specifically to a CMOS disk drive control having back-EMF blocking circuitry.

During the power down operation of a disk drive, it is desirable to move the recording or pick up head off the storage medium to minimize damage to the head and the medium, and to minimize friction between the head and the medium when power is reapplied to the disk drive.

Since power is not available from the main power supply, an alternate power source must be made available to retract the head. A typical alternate power source is provided by the back electromotive force (back-EMF) of the spindle motor. Typically, a blocking diode prevents power from the spindle motor from being dissipated through the main power supply circuitry. Unfortunately, these diodes have been bipolar and discrete devices, which become less attractive for use in disk drive control circuits as disk drive form factors shrink.

Therefore, it would be desirable to combine a blocking diode with other disk drive control circuitry on a standard CMOS integrated circuit chip.

SUMMARY OF THE INVENTION

In accordance with the teachings of the present invention, a CMOS disk drive control circuit having back-EMF blocking circuitry is provided. The back-EMF blocking circuitry prevents dissipation of the back-EMF when power is removed from the motor. The back-EMF provides an alternate power source for parking the read/write head. The circuit is fabricated as a single CMOS integrated circuit which is coupled between a power supply and the disk drive motor. The circuit also includes disk drive head parking circuitry and voltage regulator circuitry.

It is accordingly an object of the present invention to provide a CMOS disk drive control circuit having back-EMF blocking circuitry.

It is another object of the present invention to provide a CMOS disk drive control circuit having back-EMF blocking circuitry, in which the back-EMF blocking circuitry may be manufactured in combination with other disk drive motor control circuit elements on a standard CMOS integrated circuit.

It is another object of the present invention to provide a CMOS disk drive motor control circuit having CMOS back-EMF blocking circuitry.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
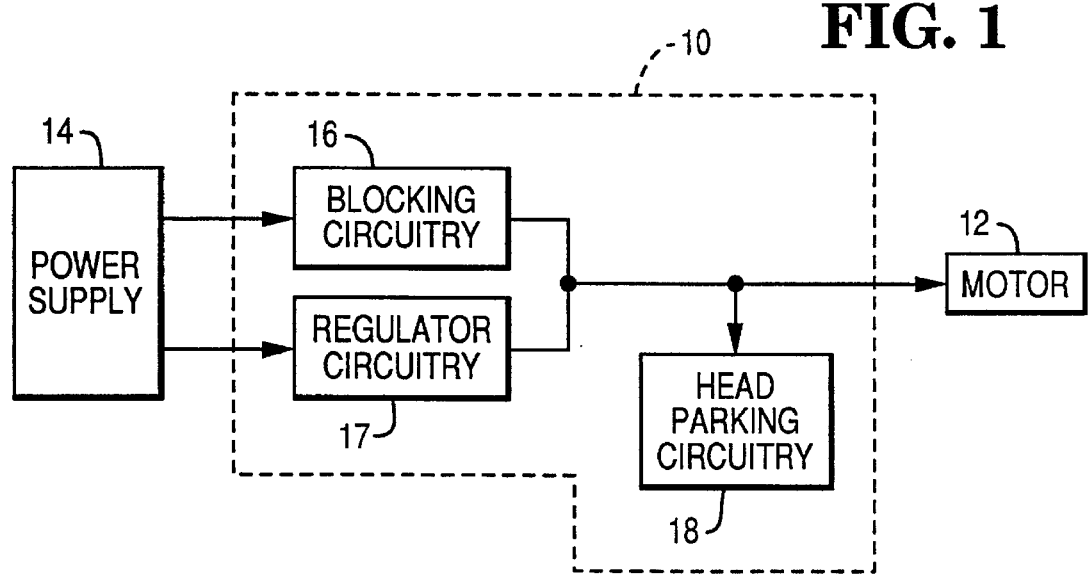
FIG. 1 is a block diagram of a CMOS motor control circuit.

Referring now to FIG. 1, CMOS motor control circuit 10 is connected between motor 12 and power supply 14, and includes blocking circuitry 16, regulator circuitry 17, and head parking circuitry 18. Motor 12 is part of a disk drive, preferably a hard disk drive, for spinning a storage medium. Power supply 14 provides power to motor 12, as well as other control circuit components. Motor 12 provides a back-electromotive force (EMF) when deactivated. Blocking circuitry 16 prevents the back-EMF from being dissipated through power supply 14 so that it can be employed by head parking circuitry 18 as an alternate power source to retract the read/write head of the disk drive away from the storage medium. Regulator circuitry 17 monitors the voltage of power supply 14 to ensure that it remains within a predetermined operating range. When power is removed, regulator circuit 17 prevents the back-EMF from exceeding the safe operating range of head parking circuitry 18 and other components of control circuit 10.

Figure 2:
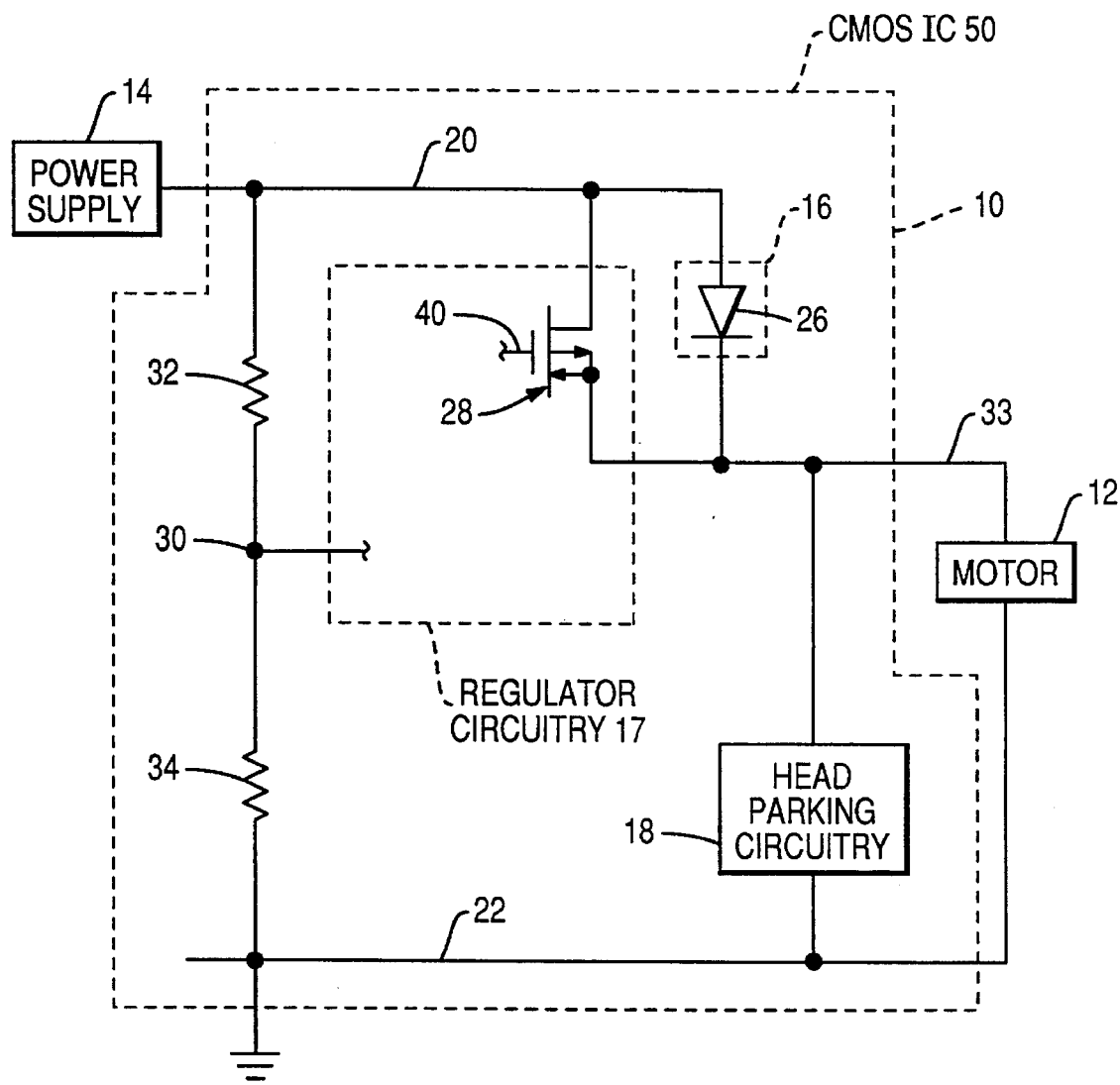
FIG. 2 is a schematic diagram of a preferred embodiment of the CMOS motor control circuit of FIG. 1 employing the CMOS blocking circuitry of the present invention.

Turning now to FIG. 2, circuit 10 is shown in more detail. System power from power supply 14 is provided through power and ground buses 20 and 22. System power is applied to regulator circuitry 17 and motor 12 through blocking circuitry 16.

Blocking circuitry 16 includes parasitic blocking diode 26.

Regulator circuitry 17 includes transistor 28.

When power supply 14 is powering motor 12, regulator circuitry 17 monitors the voltage at junction 30 of resistors 32 and 34, which is proportional to the voltage between buses 20 and 22, and compares it to a predetermined threshold voltage. As long as the supply voltage is within the predetermined range, regulator circuit 17 drives gate 40 of transistor 28 "low". Thus, transistor 28 provides a low-impedance path to power rail 33.

When system power is turned "off", regulator circuitry 17 senses a drop in voltage at junction 30 and forces gate 40 "high", thereby turning transistor 28 "off".

Regulator circuitry 17 also decreases the back-EMF if it exceeds a safe operating range.

Parasitic blocking diode 26 blocks current flow to power supply 14 from the back-EMF and parasitic voltages in circuit 10.

Thus, the back-EMF from motor 12 is preserved so that it may be employed by head parking circuitry 18 to retract and park the head from the storage medium.

Advantageously, the components of circuit 10, except for motor 12 and power supply 14, are all fabricated as part of a single CMOS integrated circuit (IC) chip 50.

Although the present invention has been described with particular reference to certain preferred embodiments thereof, variations and modifications of the present invention can be effected within the spirit and scope of the following claims.

What is claimed is:

1. In a disk drive having a disk drive head, a control circuit between a power supply and a disk drive motor comprising:

a CMOS integrated circuit chip including a diode between the motor and the power supply which prevents dissipation of a back-EMF from the motor through the power supply when power from the power supply is removed from the motor, a disk drive head parking circuit which uses the back-EMF to retract and park the disk drive head, and a switch in parallel with the diode having off and on positions wherein the switch provides power from the power supply to the motor in the on position.

* * * * *